United States Patent
Yoon et al.

(10) Patent No.: US 9,702,456 B2
(45) Date of Patent: Jul. 11, 2017

(54) METHOD FOR CONTROLLING VEHICLE TO IMPLEMENT AUTOMATIC VEHICLE HOLD FUNCTION

(71) Applicant: HYUNDAI MOTOR COMPANY, Seoul (KR)

(72) Inventors: Young Min Yoon, Suwon-si (KR); Tae Hee Cho, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 7 days.

(21) Appl. No.: 15/060,196

(22) Filed: Mar. 3, 2016

(65) Prior Publication Data
US 2017/0114891 A1    Apr. 27, 2017

(30) Foreign Application Priority Data
Oct. 27, 2015    (KR) .................. 10-2015-0149260

(51) Int. Cl.
*B60W 10/00* (2006.01)
*F16H 61/20* (2006.01)

(52) U.S. Cl.
CPC ......... *F16H 61/20* (2013.01); *F16H 2312/04* (2013.01)

(58) Field of Classification Search
None
See application file for complete search history.

(56) References Cited

U.S. PATENT DOCUMENTS

| | | | | |
|---|---|---|---|---|
| 4,648,289 A * | 3/1987 | Kubo | .................. | F16H 61/20 477/114 |
| 5,788,596 A * | 8/1998 | Robinson | .................. | F16H 3/66 475/118 |
| 6,730,000 B1 * | 5/2004 | Leising | ................. | B60W 10/06 477/110 |
| 7,051,859 B2 * | 5/2006 | Yurgil | .................... | B60K 6/365 192/219.2 |
| 7,744,166 B2 | 6/2010 | Leiter et al. | | |
| 7,946,943 B2 * | 5/2011 | Taal | .................... | F16H 61/0059 475/123 |
| 8,162,798 B2 * | 4/2012 | Taal | ......................... | F16H 3/66 477/114 |
| 8,649,952 B2 * | 2/2014 | Nedorezov | ............. | F16H 61/16 701/300 |

(Continued)

FOREIGN PATENT DOCUMENTS

| JP | 2010-014168 A | 1/2010 |
|---|---|---|
| JP | 2014-054945 | 3/2014 |

(Continued)

OTHER PUBLICATIONS

Korean Office Action dated Aug. 23, 2016, issued in Korean Patent Application No. 10-2015-0149260.

*Primary Examiner* — Dirk Wright
(74) *Attorney, Agent, or Firm* — McDermott Will & Emery LLP

(57) ABSTRACT

A method for controlling a vehicle to implement an Automatic Vehicle Hold (AVH) function includes operating an Electronic Stability Control (ESC) such that an AVH function begins to be exhibited, controlling a transmission such that the transmission is in an interlocked state when a predetermined amount of time elapses after operating the ESC, and releasing the operation of the ESC when the transmission is in the interlocked state.

5 Claims, 5 Drawing Sheets

(56) References Cited

U.S. PATENT DOCUMENTS

| | | | |
|---|---|---|---|
| 8,827,860 B2 * | 9/2014 | Mellet | F16H 3/66 475/254 |
| 8,864,623 B2 * | 10/2014 | Doering | B60W 10/023 477/175 |
| 9,193,346 B2 * | 11/2015 | Tachibanada | B60W 10/10 |
| 2006/0267402 A1 | 11/2006 | Leiter et al. | |

FOREIGN PATENT DOCUMENTS

| | | |
|---|---|---|
| JP | 2014-054946 A | 3/2014 |
| KR | 10-2006-0132710 A | 12/2006 |
| KR | 10-2007-0106205 A | 11/2007 |
| KR | 10-2011-0011250 A | 2/2011 |
| KR | 10-2013-0046828 A | 5/2013 |
| KR | 10-2013-0060942 A | 6/2013 |
| KR | 10-2013-0066388 A | 6/2013 |
| WO | WO 2015046188 A1 * 4/2015 ......... F16H 61/0059 |

\* cited by examiner

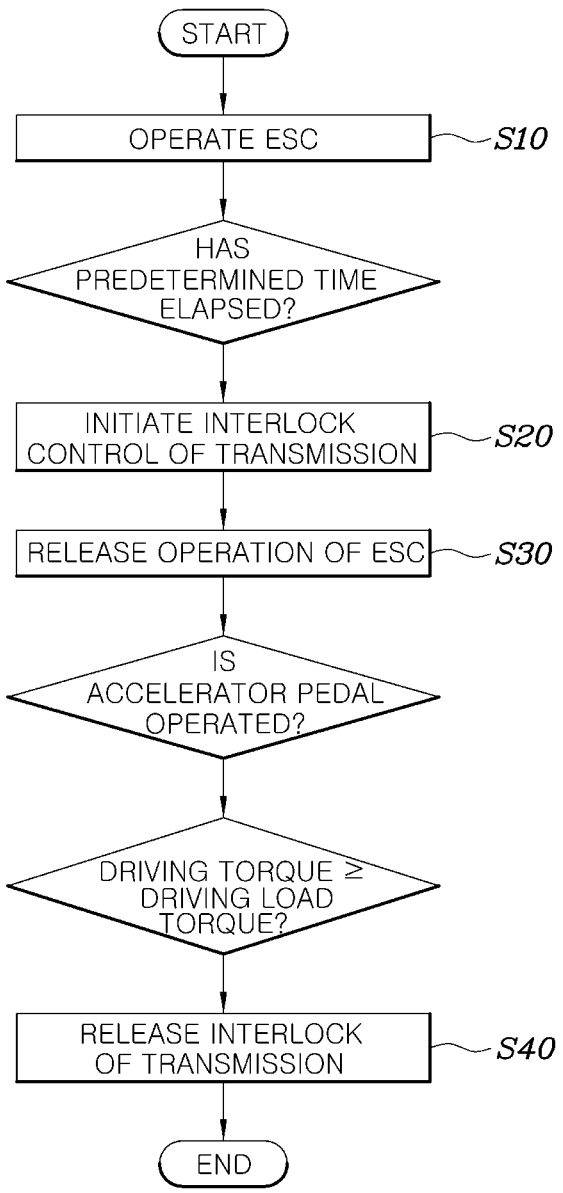
[FIG. 1]

[FIG. 2]
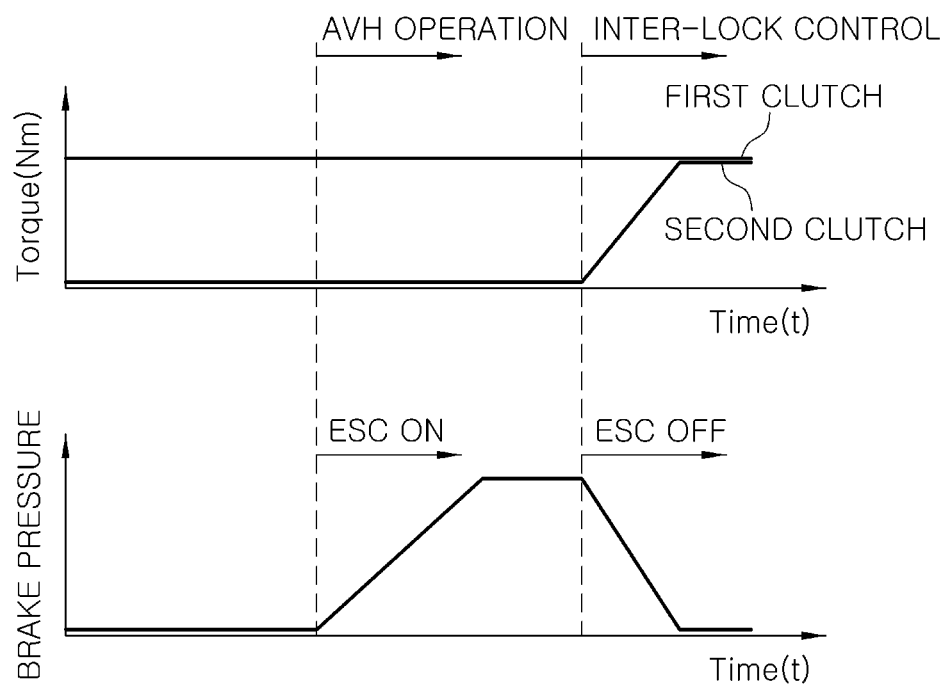

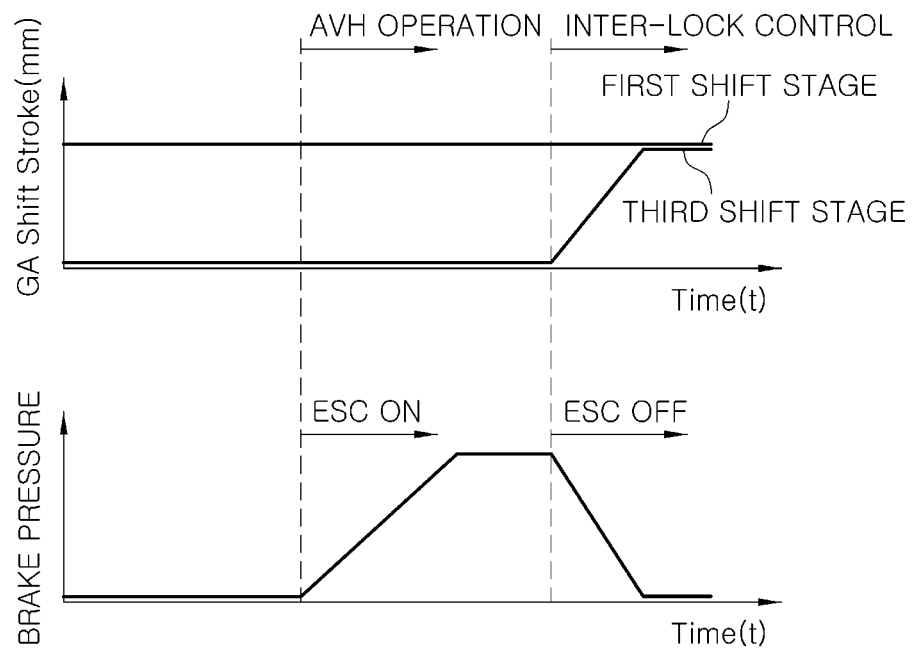
[FIG. 3]

[FIG. 4]
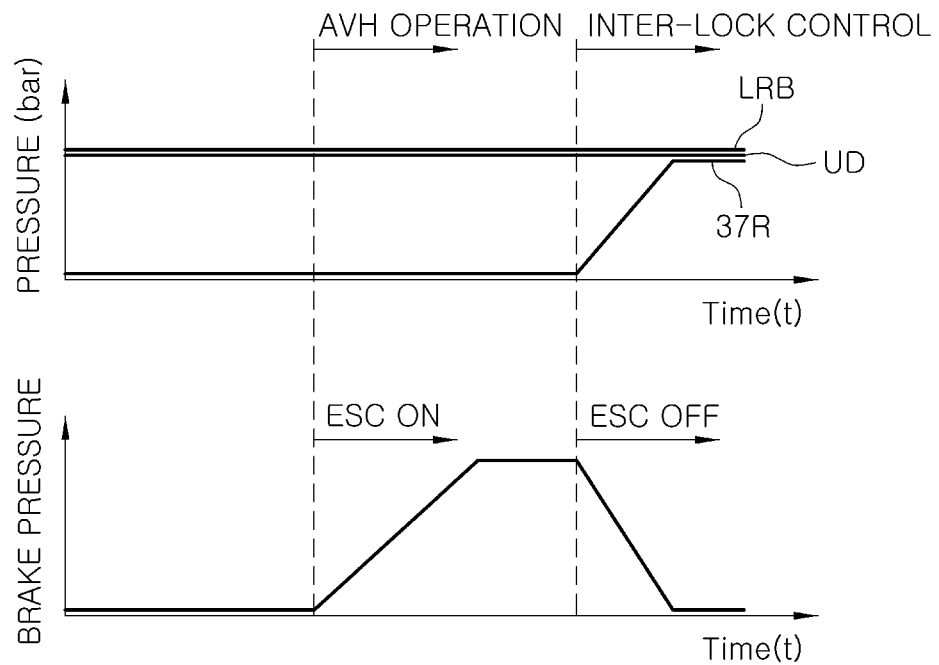

[FIG. 5]
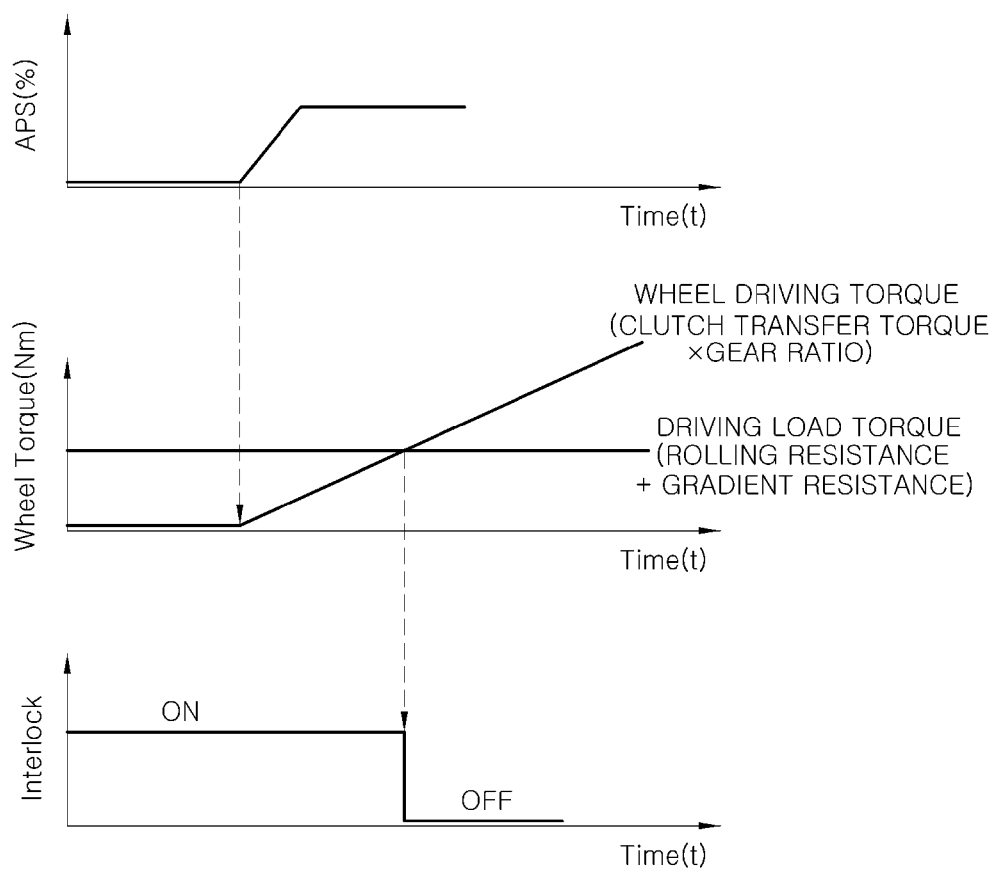

METHOD FOR CONTROLLING VEHICLE TO IMPLEMENT AUTOMATIC VEHICLE HOLD FUNCTION

CROSS-REFERENCE TO RELATED APPLICATION

This application claims the benefit of priority to Korean Patent Application No. 10-2015-0149260, filed on Oct. 27, 2015 with the Korean Intellectual Property Office, the disclosure of which is incorporated herein by reference.

TECHNICAL FIELD

The present disclosure relates to a technology for implementing an Automatic Vehicle Hold (AVH) function.

BACKGROUND

An AVH function enables a vehicle to be maintained in a stopped state from the time a driver stops the vehicle by pressing a brake pedal until the driver resumes movement of the vehicle again, even if the driver removes her/his foot from the pedal, thereby eliminating the need for the driver to continuously press the brake pedal.

Such an AVH function is conventionally implemented as a combination of an Electronic Stability Control (ESC) and an Electronic Parking Brake (EPB). That is, when the AVH function is initially performed, the ESC is operated such that the vehicle is maintained in a braked state. When the AVH function is continuously required even after a predetermined amount of time has elapsed, the EPB is operated such that the vehicle is maintained in a braked state and the function of the ESC is released.

In order to implement the AVH function as described above, the system for generating braking power must be converted in such a manner that the ESC is operated and the EPB is then operated after the predetermined amount of time has elapsed. This is because durability issues, such as the heating of solenoid valves, may occur when the ESC is operated continuously for a long time, and because there is a need to ensure safety if the driver gets out of the vehicle by mistake.

In addition, since the EPB function is mainly an advanced function that is optionally applied to vehicles, it is difficult to implement the AVH function in vehicles lacking the EPB function.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Therefore, the present disclosure has been made in view of the above problems, and it is an object of the present disclosure to provide a method for controlling a vehicle to implement an AVH function, in which an AVH function can be stably implemented in a vehicle having only an ESC without an EPB, thereby enabling the AVH function to be implemented in a greater variety of vehicles without incurring additional costs.

In accordance with the present disclosure, the above and other objects can be accomplished by the provision of a method for controlling a vehicle to implement an AVH function, which includes operating an ESC such that an AVH function begins to be exhibited, controlling a transmission such that the transmission is in an interlocked state when a predetermined amount of time elapses after the operating an ESC, and releasing the operation of the ESC when the transmission is in the interlocked state.

The method may further include releasing the interlocked state of the transmission so as to release the AVH function when a driver operates an accelerator pedal after the releasing the operation of the ESC.

In the step of releasing the interlocked state of the transmission, the interlocked state of the transmission may be released at a point of time at which a driving torque of a driving wheel is higher than a driving load torque due to operation of the accelerator pedal by the driver.

In the step of controlling a transmission, the transmission may be controlled such that power is simultaneously transferred through shift stages having different gear ratios.

In the step of controlling a transmission, when the transmission is a DCT, two clutches of the DCT may be both engaged and shift stages connected to the respective clutches may be engaged together.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a flowchart illustrating a method of controlling a vehicle according to an embodiment of the present disclosure;

FIG. 2 is a view illustrating a state in which all steps from an entry step to a braking power conversion step in FIG. 1 are realized in a vehicle having a first type of DCT, according to an embodiment of the present disclosure;

FIG. 3 is a view illustrating a state in which all steps from the entry step to the braking power conversion step in FIG. 1 are realized in a vehicle having a second type of DCT according to an embodiment of the present disclosure;

FIG. 4 is a view illustrating a state in which all steps from the entry step to the braking power conversion step in FIG. 1 are realized in a vehicle having an Automatic Transmission (AT) according to an embodiment of the present disclosure; and FIG. 5 is a view illustrating that a release step in FIG. 1 is realized.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Referring to FIG. 1, a method for controlling a vehicle to implement an AVH function according to an embodiment of the present disclosure may include an entry step (S10) of operating an ESC such that an AVH function begins to be implemented, an interlock step (S20) of controlling a transmission such that the transmission is in an interlocked state after a predetermined amount of time has elapsed since the entry step, a braking power conversion step (S30) of releasing the operation of the ESC when the transmission enters the interlocked state in the interlock step, and a release step (S40) of releasing the interlocked state of the transmission so as to release the AVH function when a driver operates an accelerator pedal after the braking power conversion step.

That is, the present disclosure initially implements the AVH function using the ESC, and then maintains the braked state of the vehicle by controlling the transmission such that the transmission is in the interlocked state without using the ESC after the predetermined amount of time has elapsed, thereby stably implementing the AVH function even in a vehicle lacking an EPB.

Here, the predetermined amount of time may be suitably set such that the durability of the ESC may be secured, and may be set to, but is not limited to, about 5 to 10 minutes in consideration of the related art.

In the interlock step (S20), the transmission may be controlled such that power may be simultaneously transferred through shift stages having different gear ratios.

That is, when the power is simultaneously transferred through shift stages having different gear ratios in one transmission, the output shaft of the transmission may ultimately not be rotated due to the different gear ratios, whereby driving wheels may be constantly maintained in a braked state.

FIGS. 2 to 4 illustrate a case in which interlocked states are formed in respective transmissions and the present disclosure is performed in these states. Since the transmissions have different configurations, the control elements for controlling the formation of the interlocked states may differ from each other.

FIG. 2 illustrates a case in which, when the transmission is a first type of Dual Clutch Transmission (DCT), an interlocked state is formed. In the DCT, first and second clutches are respectively connected to first and second input shafts, and the first and second clutches are engaged in the state in which one shift stage, which may be formed through the first input shaft, is engaged while the other shift stage, which may be formed through the second input shaft, is also engaged, thereby forming the interlocked state.

For example, first, third, and fifth shift stages may be formed through the first input shaft connected to the first clutch, and second, fourth, and reverse shift stages may be formed through the second input shaft connected to the second clutch. In this case, when first and second clutch torques are controlled to be increased in the state in which each of the first and second shift stages is engaged, power from the engine to the driving wheels may be ultimately transferred through a dual path, which is simultaneously formed of a path defined by the first clutch and the first input shaft and another path defined by the second clutch and the second input shaft, thereby allowing the transmission to be in the interlocked state. Consequently, the rotation of the output shaft and the driving wheels may be suppressed.

FIG. 3 illustrates a case in which interlock control is realized in a vehicle having a second type of DCT. The second type of DCT is a transmission in which each shift stage may be individually selected without separate selecting, and the interlock control is realized by simultaneously engaging first and third shift gears.

FIG. 4 illustrates a case in which interlock control is realized in a vehicle having an Automatic Transmission (AT). The AT of FIG. 4, among various kinds of AT, is a transmission in which the working pressures of a low reverse brake and a UD clutch are applied when a first shift stage is realized, and the working pressures of the UD clutch and a 37R clutch are applied when a third shift stage is realized. In this case, the interlock control is realized by applying all working pressures of the low reverse brake, the UD clutch, and the 37R clutch to the transmission, as illustrated in the drawing.

The interlock control of the present disclosure may be realized in other transmissions which are not illustrated in the embodiment when all operation elements of the transmissions are combined such that each transmission itself is in an interlocked state and the output shaft of the transmission may not be rotated.

In the release step (S40), the interlocked state of the transmission may be released at the point of time at which an Accelerator Position Sensor (APS) signal is increased due to an operation of the accelerator pedal by the driver, and the driving torque of the driving wheel may then be higher than a driving load torque, as illustrated in FIG. 5.

That is, the interlocked state may be released when the vehicle does not roll backward by having a sufficient driving torque, even though the driver presses the accelerator pedal with the intention of commencing movement of the vehicle. Consequently, even when the AVH function is completed and the vehicle is started, the vehicle does not roll backward on an inclined road.

Here, in the case of the DCT, the driving torque may be obtained by multiplying a clutch transfer torque by a gear ratio, and the driving load torque may be obtained by adding the rolling resistance of the vehicle to a gradient resistance.

As is apparent from the above description, in accordance with the present disclosure, an AVH function can be stably implemented in a vehicle having only an ESC without an EPB, thereby enabling the AVH function to be implemented in a greater variety of vehicles without incurring additional costs.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method for controlling a vehicle to implement an Automatic Vehicle Hold (AVH) function, comprising:
    operating an Electronic Stability Control (ESC) such that an AVH function begins to be exhibited;
    controlling a transmission such that the transmission is in an interlocked state when a predetermined amount of time elapses after operating the ESC; and
    releasing the operation of the ESC when the transmission is in the interlocked state.

2. The method according to claim 1, further comprising releasing the interlocked state of the transmission so as to release the AVH function when a driver operates an accelerator pedal after the step of releasing the operation of the ESC.

3. The method according to claim 2, wherein, in the step of releasing the interlocked state of the transmission, the interlocked state of the transmission is released at a point of time at which a driving torque of a driving wheel is higher than a driving load torque due to an operation of the accelerator pedal by the driver.

4. The method according to claim 1, wherein, in the step of controlling a transmission, the transmission is controlled such that power is simultaneously transferred through shift stages having different gear ratios.

5. The method according to claim 4, wherein, in the step of controlling a transmission, when the transmission is a DCT, two clutches of the DCT are both engaged and shift stages connected to the respective clutches are engaged together.

* * * * *